United States Patent [19]

Hatton

[11] Patent Number: 5,660,617
[45] Date of Patent: Aug. 26, 1997

[54] SYSTEM AND METHOD FOR MAINTAINING MULTIPHASE FLOW WITH MINIMAL SOLIDS DEGRADATION

[75] Inventor: Gregory John Hatton, Kingwood, Tex.

[73] Assignee: Southwest Research Institute, San Antonio, Tex.

[21] Appl. No.: 648,625

[22] Filed: May 16, 1996

[51] Int. Cl.$^6$ .................................................. B01D 19/00
[52] U.S. Cl. ........................ 95/254; 73/438; 73/861.04; 95/258; 96/204; 96/206
[58] Field of Search .......................... 95/256–258, 254; 96/188, 204, 206; 73/438, 861.04

[56] References Cited

U.S. PATENT DOCUMENTS

| | | | |
|---|---|---|---|
| 2,451,604 | 10/1948 | Barnes | 73/438 |
| 2,751,031 | 6/1956 | Smith et al. | 95/258 X |
| 2,952,152 | 9/1960 | Fisher et al. | 374/24 |
| 2,971,604 | 2/1961 | Lowery | 96/204 X |
| 3,377,778 | 4/1968 | Gaertner | 96/204 X |
| 3,432,992 | 3/1969 | Moore | 95/258 |
| 3,690,184 | 9/1972 | Chadenson | 73/438 |
| 4,216,089 | 8/1980 | Boon et al. | 95/254 X |
| 4,274,283 | 6/1981 | Maus et al. | 73/152.22 |
| 4,352,680 | 10/1982 | Hackler | 95/258 X |
| 4,369,047 | 1/1983 | Arscott et al. | 95/258 X |
| 4,508,545 | 4/1985 | DeLoach | 96/204 X |
| 4,660,414 | 4/1987 | Hatton et al. | 73/61.44 |
| 4,708,793 | 11/1987 | Cathriner et al. | 96/188 X |
| 4,752,306 | 6/1988 | Henriksen | 95/258 X |
| 4,760,742 | 8/1988 | Hatton | 73/861.04 |
| 5,251,488 | 10/1993 | Haberman et al. | 73/861.04 |
| 5,394,339 | 2/1995 | Jones | 364/510 |

FOREIGN PATENT DOCUMENTS

| | | | |
|---|---|---|---|
| 9704/27 | 7/1928 | Australia | 95/258 |
| 619617 | 5/1961 | Canada | 95/258 |

*Primary Examiner*—Richard L. Chiesa
*Attorney, Agent, or Firm*—Gunn, Lee & Miller, P.C.

[57] ABSTRACT

An apparatus and method for maintaining continuous flow in a closed loop test system, of a multiphase composition such as that utilized and obtained from oil and gas wells and the like. The method and system provide a test structure whereby a study of the changes in a multiphase composition (gas/liquid/solid) flow can be studied. Specifically, the method and apparatus provide for pressure boosting the gaseous components of the multiphase composition after separation from the liquid and solid components of the system. A hydrostatic head through which the liquid and solid components flow provides the necessary potential energy-kinetic energy exchange such that when the pressure boosted gas is recombined with the downcomer liquid/solid components, continuous flow of the multiphase composition is maintained. Pressure and temperature controls permit the accurate maintenance of pressure, temperature and flow conditions so as to imitate a real-world environment for multiphase composition flow.

5 Claims, 3 Drawing Sheets

SYSTEM AND METHOD FOR MAINTAINING MULTIPHASE FLOW WITH MINIMAL SOLIDS DEGRADATION

BACKGROUND OF THE INVENTION

1. Field of the Invention

The present invention relates generally to systems and methods for circulating a mixture of fluids, solids, and gases around a flow loop for testing purposes. More specifically, the present invention relates to a system and a method for providing the pressure boost necessary to maintain the circulation of a mixture of fluids, solids, and gases around a multiphase flow loop with minimal shearing, cutting, smashing, or other alteration of the solids during the pressure boosting process and the maintenance of an accurate simulation of long, multiphase flow, conduit conditions.

2. Description of the Related Art

The design of long conduit multiphase flow systems depends upon an accurate understanding of the behavior of the various liquid, solid, and gaseous components of the flow over time. Test systems designed to imitate real world long conduit flow have generally failed to provide an environment where such an accurate analysis can be achieved.

Multiphase (gas/liquid/solid) flow test loops generally consist of a conduit loop test section, a separator to remove most of the gas from the liquid and solid components, a gas compressor, a pump for maintaining the flow of the liquid stream with entrained gases and solids, controllers and meters for the liquid stream (with entrained gases and solids), and a mixing section for recombining the pressure boosted components upstream of the loop test section. In some cases, following the test section, the flow stream is heated to melt the solids, the liquid and gas components are then separated, and later recombined downstream of the pressure boosting, flow controllers, meters, and temperature controllers.

When delicate solids are present in a multiphase flow stream, the consequences of pumping the liquid stream (with entrained gases and solids) may be undesirable. In particular, the pressure boosting pump may cut, shear, crush, or otherwise alter the character of the solids. To reduce this problem, pumps with the least solids destructive behavior are selected and the length of the loop is increased, thereby reducing the number of times a particular solid passes through the pump while traversing a given length of test section.

When studying the growth, agglomeration, and other characteristics of solids transport, it is of considerable value to significantly reduce pump degradation. The present invention is directed to providing pressure boosting to circulate multiphase flow components around a test loop without requiring the liquids and solids to pass through a traditional pump. Past efforts along these lines have not been successful.

U.S. Pat. No. 2,451,604, issued to Barnes on Oct. 19, 1948, describes an apparatus for maintaining multiphase flow and for measuring the density of a thixotropic fluid such as the drilling mud used in the rotary drilling of wells. In the Barnes invention, mud is diverted from the flow stream and is passed through a chamber that establishes a vertical hydrostatic head whose pressure differentials are measured through a standard mercury-based pressure sensor.

U.S. Pat. No. 2,952,152, issued to Fisher et al. on Sep. 13, 1960, describes a gel point indicator directed to identifying the temperature at which a fluid gels. The apparatus describes a vertical column (similar in some respects to a vertical hydrostatic head structure) that provides the necessary cooling for the system but otherwise involves no continuous flow of a fluid.

U.S. Pat. No. 3,690,184, issued to Chadenson on Sep. 12, 1972, describes an apparatus for statistically measuring the average density of a liquid circulating in a pipeline. Fluid is diverted into a column and the density is measured by comparing the hydrostatic pressure between the column and a reference column.

U.S. Pat. No. 4,274,283, issued to Maus et al. on Jun. 23, 1981, describes an apparatus and method for measuring fluid gel strength such as that for drilling mud. In this system, the flow of drilling mud through a conduit is interrupted and a differential pressure between various points in the flow is measured.

U.S. Pat. No. 4,660,414, issued to Hatton et al. on Apr. 28, 1987, describes a petroleum stream monitoring system and method wherein a crude oil production stream flows through a separating device to remove substantially all gas components. Various parameters are measured in this system including temperature, gas velocity, liquid flow, etc., thereby providing indications of gas, oil, and water flow rates through the multiphase system.

U.S. Pat. No. 4,760,742, issued to Hatton on Aug. 2, 1988, describes a multiphase petroleum stream monitoring system and method similar to the '414 Hatton patent and also discloses a gas separation means.

U.S. Pat. No. 5,251,488, issued to Haberman et al. on Oct. 12, 1993, discloses a multiphase volume and flow test instrument wherein fluid is diverted into a test section and either allowed to separate into its various phase components or chemically aided in this process. Floats within the apparatus, tuned to the densities of the various components, are used to determine the relative quantities of those components within the flow.

U.S. Pat. No. 5,394,339, issued to Jones on Feb. 28, 1995, describes an apparatus for analyzing oil well production fluid wherein the fluid is diverted to a test pipe where various phase components are measured.

Most of the previous attempts to analyze, measure, and regulate the flow of fluids in a system for the purposes of testing and evaluation, have focused on specific efforts to identify the relative composition of the flow compounds and/or to separate the various components at points in the flow for specific analysis and study. Efforts to accurately simulate the environment within which fluids must perform in actual field conditions have been limited and inadequate in most situations. In almost every instance, the effort to accurately simulate a long conduit flow for fluids has failed to recreate accurately the flow environment for such fluids. This failure relates to the inability to appropriately control and sustain the multiphase composition of the fluid at the same time as the flow itself is being maintained constant. Well known methods for maintaining flow generally work against the maintenance of a consistent and constant liquid/gas/solid composition.

It would be desirable, therefore, to have a system that imitates the environment within which fluids are likely to flow in real case scenarios and yet provide such a system with a closed loop structure on a limited dimensional scale that will make the testing and analysis practical. Such a system would have to be able to separate the components, boost the pressure in each of the components to maintain flow, and recombine the components in such a way that the composition of the flow after pressure boosting is as close as possible to the composition prior to such actions.

SUMMARY OF THE INVENTION

The present invention overcomes the destructive nature of current state-of-the-art multiphase loops by pressure boosting the flow components via a method and apparatus in which the liquids and solids flow at rates less than, and in piping similar to that of the loop test section.

The complete flow loop of the present invention may be considered to have two parts: a test section, and a separation/pressure boosting section. The detailed structures of the test section are designed to provide the desired testing environment. The separation/pressure boosting section is composed of an apparatus which adequately separates gas from the flow, a predominantly liquid filled downcomer array, and a section in which the pressure boosted gas is recombined with the rest of the flow stream. In the examples discussed below, the separation section is composed of piping similar to that of the test section, the downcomers are of a diameter the same, or smaller than the test section, and the flow in the recombination section is at a velocity no greater than that of the test section.

In the present invention, the driving (pressure boosting) mechanism for the liquid and solid components is the hydrostatic head of the downcomer array, and the driving mechanism for the separated gas is the compressor. Since the in situ velocity of the liquid and solid components is lower in the downcomers than in the test section, the solid components sustain little degradation in the downcomer array. The solid component's pressure boosting thus occurs under conditions very similar to flow in a pipeline.

DESCRIPTION OF THE PREFERRED EMBODIMENT

Figure 1:
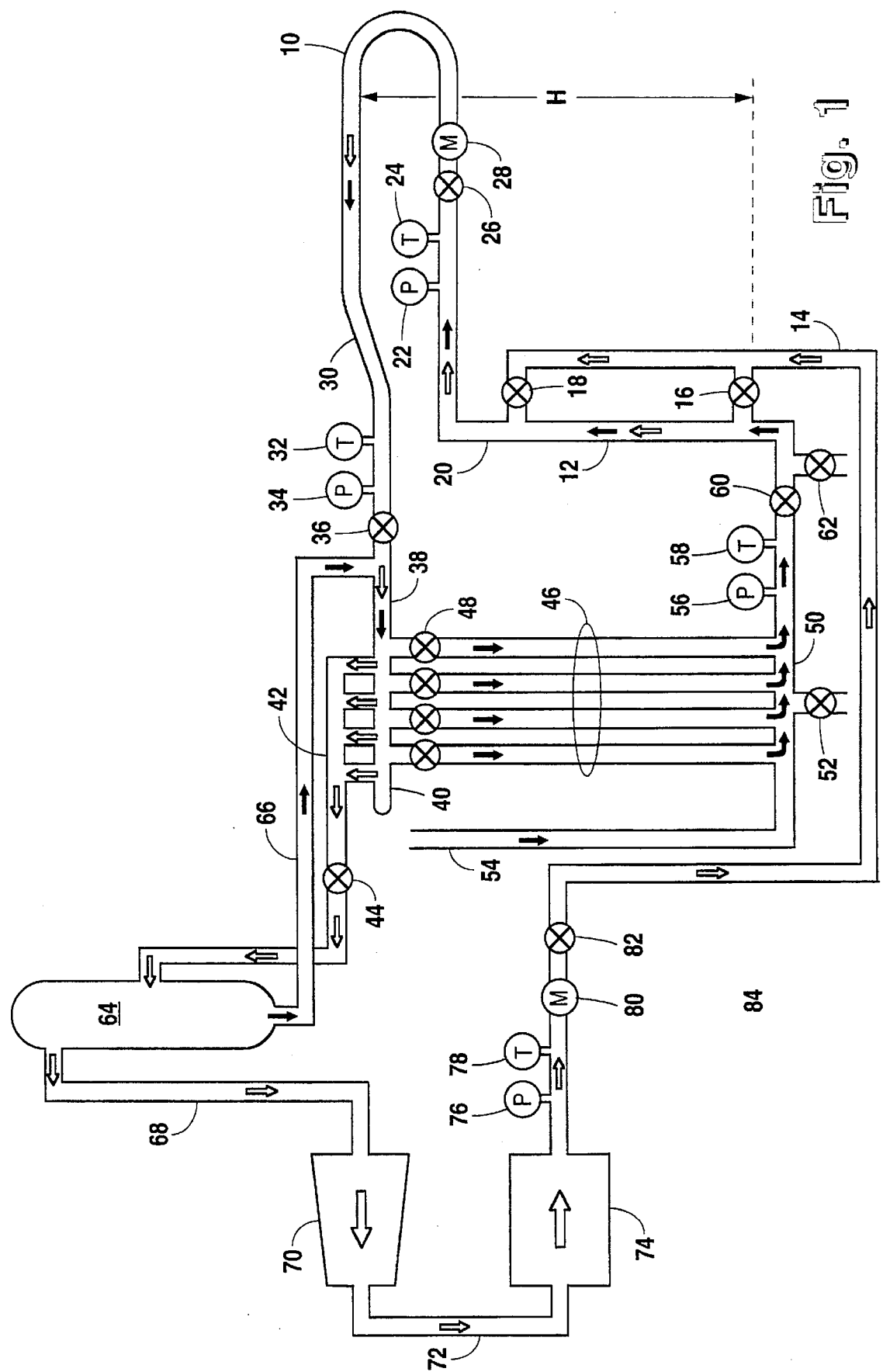
FIG. 1 discloses in schematic form the fundamental components of the flow loop and pressure boosting system of the present invention.

Reference is made first to FIG. 1 for a detailed description of the fundamental components of the multiphase flow loop of the present invention. It should be noted that FIG. 1 is intended to schematically show the complete flow loop of the present invention but does not necessarily disclose the actual vertical or horizontal positions of the elements. Once again, the goal of the system of the present invention is to simulate the conditions that production fluids and other multiphase fluids would experience in real world operation. This is accomplished by providing a conduit for the multiphase fluid flow whose dimensions balance the need for a long flow path and the need for a confined testing apparatus. Conduit (10), shown in FIG. 1 schematically as a small section of conduit, represents a test section of conduit that is much shorter in overall length than the long distance flow lines to be simulated. It is not unusual in deep water production environments for fifty-mile long flow lines to be installed or planned. Clearly, the installation of such a lengthy flow line for testing purposes is impractical, so a scaled down test section, such as in the quarter-mile loop in the preferred embodiment of the present invention for example, is utilized instead. As long as other factors involving the pressure boosting and temperature can be controlled, the quarter-mile loop test section provides an appropriate imitation of the longer flow lines in real world applications.

Test section (10) receives the recombined multiphase flow from commingling columns (12) and (14). Column (12) carries the liquid and solid components of the multiphase fluid which are then combined with the gas component of the multiphase flow from column (14). This recombination of the fluid-solid component in column (12) with the gas component in column (14) is carried out by way of valves (16) and (18). The use of two valves (16) and (18) serves to permit variations in the rate and manner in which the gas is recombined with the fluid-solid flow. The vertical rise of the gas experienced from either valve (16) or valve (18) contributes to the flow rate of the overall system.

Once the liquid, solid and gas components of the multiphase fluid are recombined at point (20) in the flow loop, the multiphase fluid is characterized with pressure sensor (22) and temperature sensor (24). Test section (10) may be isolated from the pressure boosting components of the system by closing valve (26) and (36). When valves (26) and (36) are open, the flow rate in test section (10) is measured by flow meter (28). Test section (10) is generally maintained to imitate variations from the horizontal typically found in long line conduits utilized with off-shore production. Immediately prior to separating the multiphase components for pressure boosting, a declination section (30) from the horizontal is placed in the test section (10) such that the separation process, especially as between the gaseous elements and the liquid/solid elements, is smoothed out. Such a declination angle (30) provides a natural separation between the heavier liquid/solid components and the lighter gaseous components. Temperature and pressure of the multiphase fluid flow are again measured at this point with temperature sensor (32) and pressure monitor (34). The multiphase flow moves into the separator section through conduit section (38).

The specific configuration of the separator is described in more detail below with respect to FIG. 2, but the general components can be seen in FIG. 1. The separator comprises a terminal end (40) of flow loop (10) which directs the multiphase components either into gas manifold (42) or downcomer array (46). Downcomers (46) are controlled by an array of valves (48), while gas manifold (42) is controlled by valve (44).

Downcomers (46) terminate in conduit section (50) which is provided with a drain valve (52) for evacuation of downcomer array (46). Fluid may be added to the system through conduit (54) which connects with conduit section (50). As the fluid/solid components of the multiphase flow system move back toward the test section, the pressure and temperature are again measured with pressure sensor (56) and temperature sensor (58). Flow moves through valve (60) which leads into commingling conduit section (12). A second drain port is controlled by valve (62) that permits the evacuation of commingling section (12).

The gas in the flow is drawn away from the separator through gas manifold (42), through valve (44), and into scrubber (64). Scrubber (64) removes any remaining liquid and solid components through conduit (66) and ducts these back into the flow stream at conduit section (38). The gas components leave scrubber (64) by way of conduit (68) and are pressure boosted in compressor (70). These pressure boosted gas components are ducted from compressor (70) to heat exchanger (74) by way of conduit (72). Heat exchanger (74) maintains an appropriate temperature on the gaseous elements. In the test section and the separator/pressure boosting section, well known pipe external temperature controlling systems are used to maintain the temperature in the overall multiphase flow fluids. Pressure and temperature are sensor (76) and temperature pressure sensor (76) and temperature sensor (78). Gaseous flow is measured with flow meter (80) and is controlled through valve (82). Gas flow back into the test system is made through conduit (84), which leads to commingling conduit (14) as described above.

In a preferred embodiment of the present invention, conduit (10) is a three-inch pipe that opens into a six-inch manifold (42). Gas line components (68), (72) and (84) are three-inch conduits in the preferred embodiment. Liquid riser (12) and gas riser (14) are likewise each three-inch conduits in the preferred embodiment. Downcomers (46) vary in diameter as described in more detail below.

Figure 2:
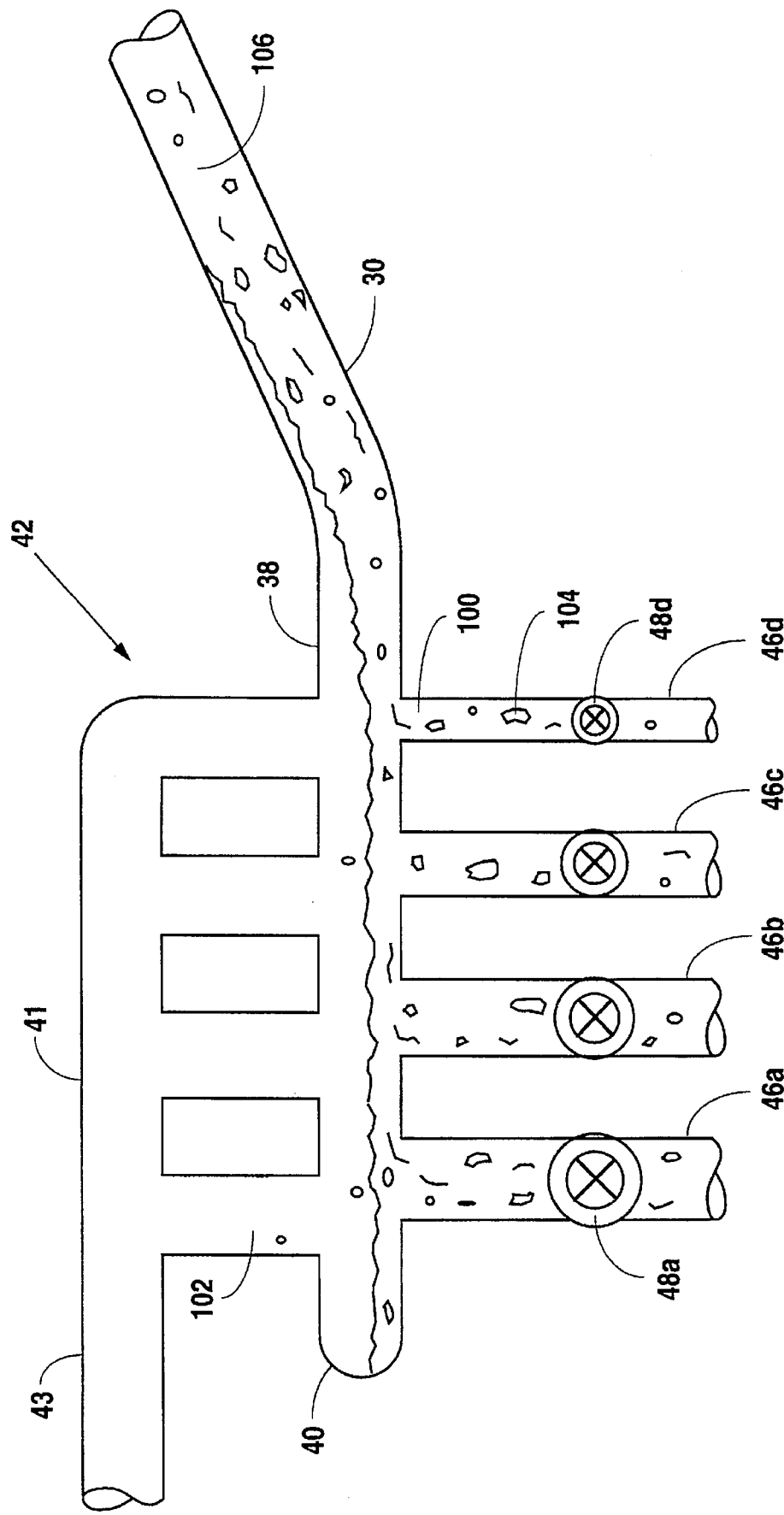
FIG. 2 discloses a detailed cross-sectional schematic view of the separator and a plurality of downcomers utilized in the system of the present invention.

Reference is now made to FIG. 2 for a description of a detailed view of the separator component of the present invention. Separator (42) has an inlet from the test loop conduit (not shown) by way of declination section (30). The multiphase fluid (106) moves down through angled conduit section (30) to separator manifold input (38). Conduit (30) is angled down to facilitate the separation between the gaseous elements in the multiphase flow and the fluid and solid elements which are directed down in the angled conduit section (30). Separator manifold (42) is comprised of a plurality of downcomers (46a–d) and a plurality of gaseous manifold ducts (102). Gaseous manifold ducts (102) join together into gas outlet conduit (41) where the gases are eventually directed to scrubber (not shown) by way of conduit (43).

Separator (42) terminates at one end in manifold terminal cap (40). Each downcomer (46a–d) incorporates a valve (48a–d) that permits the number and diameters of the downcomers to be varied according to the requirements of the test. Downcomer (46a) and (46b) are three inches in diameter in the preferred embodiment, while downcomer (46c) is two inches and downcomer (46d) is one inch in diameter. A large variety of total diameters are possible given this combination of downcomer pipe diameters.

Separation of the gas from the multiphase fluid occurs both in the manifold itself and in the downcomers which allow the gaseous elements to rise vertically upward even as the multiphase fluid flows down. Taylor bubbles (104) rise up through the multiphase fluid (100) as circulation in the system is maintained. The gaseous components are drawn off through the manifold and carried to the scrubber (not shown) where the final drying of the gas occurs. As indicated above with respect to in FIG. 1, any remaining liquids found in the gas are ducted back into the flow steam prior to the separator shown in FIG. 2.

Figure 3:
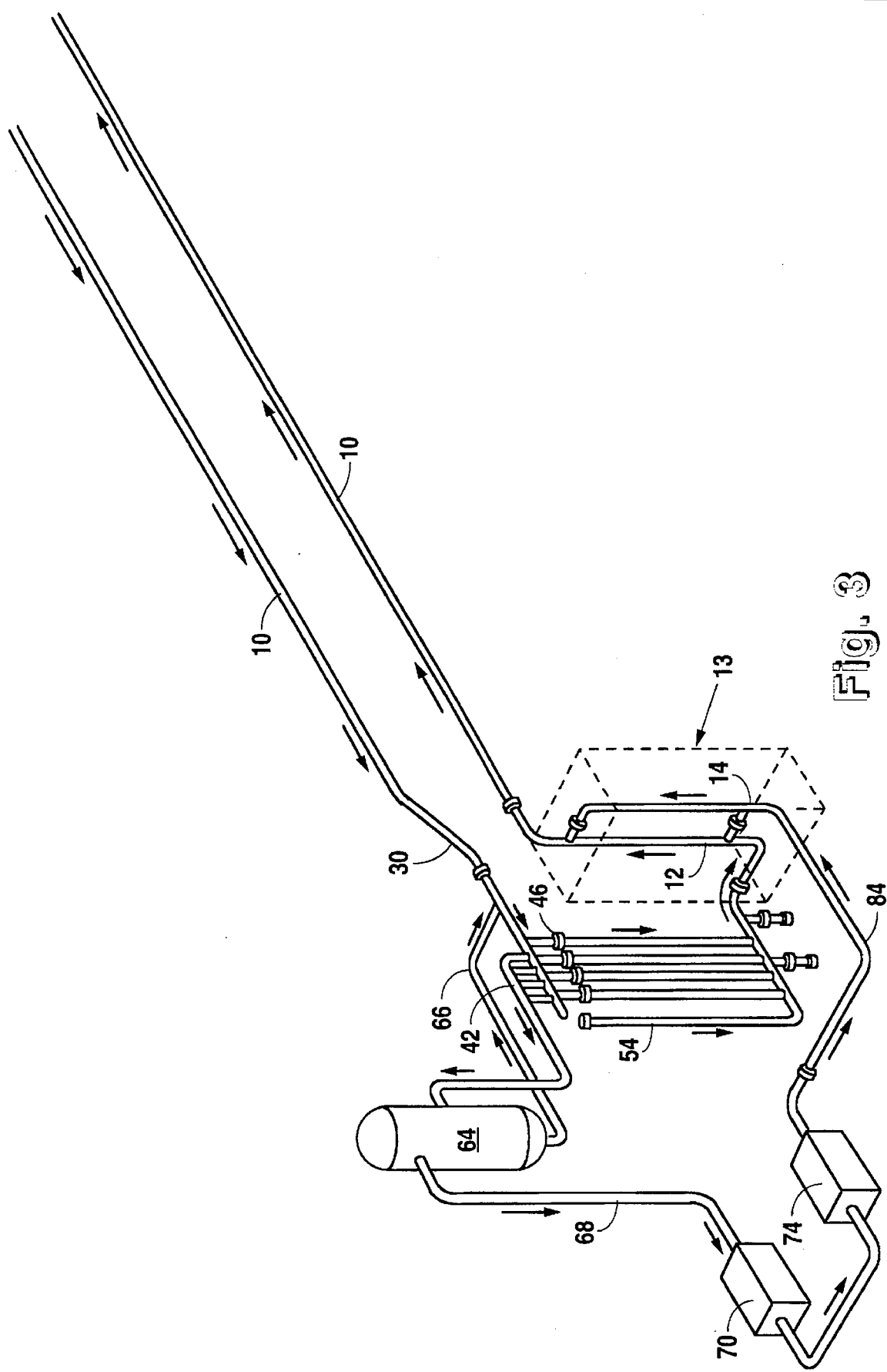
FIG. 3 is a perspective schematic drawing showing the elements of the present invention as they would be incorporated to scale in a fluid flow test system.

Reference is now made to FIG. 3 for a detailed description of a perspective view of a scale-accurate schematic of a test setup utilizing the present invention. Most of the components disclosed in FIG. 3 are identical to those described in FIG. 1, but are shown in a more appropriate scale. Test section (10) is, as indicated above, a three-inch diameter conduit of a quarter-mile in length in the preferred embodiment that provides a flow line for the fluids under test. Declination conduit (30) begins the separation process at separator (42). Downcomers (46) draw off most of the liquid/solid components of the multiphase fluid while the gaseous components are ducted off into scrubber (64). Conduit (66) returns the remaining liquid and solid components from scrubber (64) back into the multiphase flow stream. Compressor (70) takes the gaseous components from scrubber (64) and boosts the pressure on these components. Heat exchanger (74) modifies the temperature of the gas components. Conduit (84) returns the pressurized and temperature-controlled gas to riser (14) where it is combined with the liquid and solid components of the multiphase fluid in riser (12). The combination of risers (12) and (14) are generally referred to as recombination system (13). Downcomers (46) which may be selectively activated as described above, draw the solid and liquid components down to a position where they are carried up through riser (12). Liquid injection line (54) allows appropriate access for adding multiphase fluid to the system.

In the embodiment of the present invention shown in FIG. 1. Pressure boosting of the separated gas stream is provided by an ordinary gas compressor. Following this compression, the gas is optionally metered and/or cooled to an appropriate temperature before being recombined with the rest of the flow stream. Pressure boosting of the non-separated components (primarily liquid/solid) is provided by the hydrostatic head of the downcomers. After the metering of the components, the compressed gas and other components are commingled in the recombining section. Pressure drop elements (hydrostatic head, frictional pressure drop, acceleration, and other energy losses) in the test section are balanced with those in the separator and downcomers. This balance, together with the compression of the gas component provides the drive for circulating all of the components through the test section. Several gas commingling ports are provided to allow additional control.

The separator should be designed so as to provide (a) sufficient gas separation, (b) a liquid/solid stream suitable for metering if desired, and (c) minimal solids accumulation or agglomeration. In many cases, it may be desirable to also control the temperature of the separator. For example, with paraffins and hydrates, it may be desirable to maintain the separator temperature at or just above the temperature of the stream flowing into the separator.

If the solids and liquids are of equal density, then a suitable design for the separator is fairly straightforward. Usually, however, not all of the liquids and solids have the same density. In this case, the separator should be designed (and is designed in the preferred embodiment) to pass rather than accumulate the solid components. In addition, it is important to design the separator so as to not promote agglomeration of one of the solid components. In the system of the present invention, the downcomers are sized such that none of the liquid or solid components will accumulate in the separator and such that gas carry under is limited. For example, for gas, water, and ice flow, the system should be designed to pass all of the ice in a timely fashion with minimal gas carry under. The density of water, ice and gas might be 1, 0.9, and 0.09 gm/cc, respectively. The downcomer should then be designed such that the ice particles are drug down but gas bubbles greater than a given diameter are not. One possible design is that for which gas Taylor bubbles rise and ice particles carry under. For example, the velocity of a gas Taylor bubble, $V_{Taylor}$, is often given by $$V_{Taylor} = V_{mixture} + 0.35 * (g*d)^{0.5}$$

where $V_{mixture}$ is the overall mixture velocity. For a 4-inch internal diameter pipe the mixture velocity corresponding to a Taylor bubble velocity of zero is $$V_{mixture} = -0.35 * (32/3)^{0.5} = -1.14 \text{ ft/sec}$$

or about 45 gal/min. Assuming a 25% gas carry under, this provides a system with a maximum liquid and solid volumetric rate of 34 gal/min per 4-inch downcomer (or a superficial velocity of about 0.85 ft/sec). The minimum rate per 4-inch downcomer may be calculated from the solids and liquids density differences, fluid properties, and solids and droplet sizes. Generally, the relevant solid to liquid density ratio is between 0.7 and 1.3 as compared to the gas to liquid density ratio of less than 0.1. Because of this, there is usually a turndown ratio of 2.5 to 2 for each downcomer. Smaller diameter downcomers may be used to further reduce the minimum rate. Multiple downcomers (as disclosed in the preferred embodiment) allow a large maximum flow rate. At low and intermediate rates some of the downcomers may be valved off. With a 2-inch, a 3-inch, and 2@4-inch downcomers, such a system could provide a superficial liquid and solid flow rates from 0.1 to 5 ft/sec in 4-inch pipe.

By suitably choosing the height of the downcomers and the resulting hydrostatic head such a system can be readily designed to provide a sufficient drive to continually circulate the fluids through the test section.

While the method and system of the present invention have been described, it is anticipated that one skilled in the art would identify further applications of the present invention in a manner consistent with the procedures associated with the present invention. For example, both the pipe diameters and the pipe lengths identified in the description of the preferred embodiment may vary significantly according to the requirements of the test parameters.

It is anticipated that the present invention would have applications in any environment where maintaining a multiphase flow with minimal solids degradation is required.

Again, it is understood that other applications of the present invention will be apparent to those skilled in the art upon a reading of the above description of the preferred embodiments and a consideration of the appended claims and drawings.

I claim:

1. A system for circulating a multiphase composition of fluids, solids and gases continuously around a conduit loop with minimal degradation of the solids within the multiphase composition, comprising:

a conduit loop test section;

a separator, said separator removing a majority of said gas components of said multiphase composition from said liquid and solid components of said multiphase composition;

at least one downcomer conduit, said downcomer providing a hydrostatic head to facilitate circulation of said fluids and said solids around said loop;

a compressor, said compressor pressure boosting said gas components; and a recombination riser, said riser recombining said compressed gases and said downcomer fluid and solid combination, said recombination serving to maintain and boost overall multiphase composition flow within said loop test section.

2. The system of claim 1 further comprising a heat exchanger for controlling a temperature of said compressed gas.

3. The system of claim 1, wherein said at least one downcomer comprises a plurality of downcomer conduits of one or more diameters such that an overall downcomer capacity can be selected by alternately permitting or restricting flow within each of said downcomers.

4. The system of claim 1, wherein said recombination risers are in flow connection at a plurality of points such that variations in the effective hydrostatic head for said system can be selected.

5. A method for circulating a multiphase composition of fluids, solids and gases continuously around a conduit loop with minimal degradation of the solids within the multiphase composition, comprising the steps of:

separating said gaseous components of said multiphase composition from said liquid and solid components of said multiphase composition;

drying said gaseous components of said multiphase composition;

pressure boosting said gaseous components;

maintaining said pressure boosted gaseous components at a preselected temperature through a heat exchanger;

permitting a flow of said liquid and said solid components of said multiphase composition by drawing said components by gravitational forces through at least one downcomer conduit;

recombining said pressure boosted gaseous components with said downcomer drawn liquid and solid components of said multiphase composition in a recombination riser conduit; and continuing a flow of said recombined gaseous and liquid/solid components of said multiphase composition through a test loop section;

wherein said recombination risers serve to maintain a continuous flow of said multiphase composition through said test loop section.

* * * * *